Aug. 20, 1957     H. R. SUMMERHAYES, JR     2,803,161
SURFACE ROUGHNESS MEASURING METHOD AND DEVICE
Filed Oct. 2, 1952                                    2 Sheets-Sheet 1

Inventor:
Harry R. Summerhayes, Jr.
by Paul A. Frank
His Attorney.

Aug. 20, 1957     H. R. SUMMERHAYES, JR     2,803,161
SURFACE ROUGHNESS MEASURING METHOD AND DEVICE
Filed Oct. 2, 1952     2 Sheets-Sheet 2
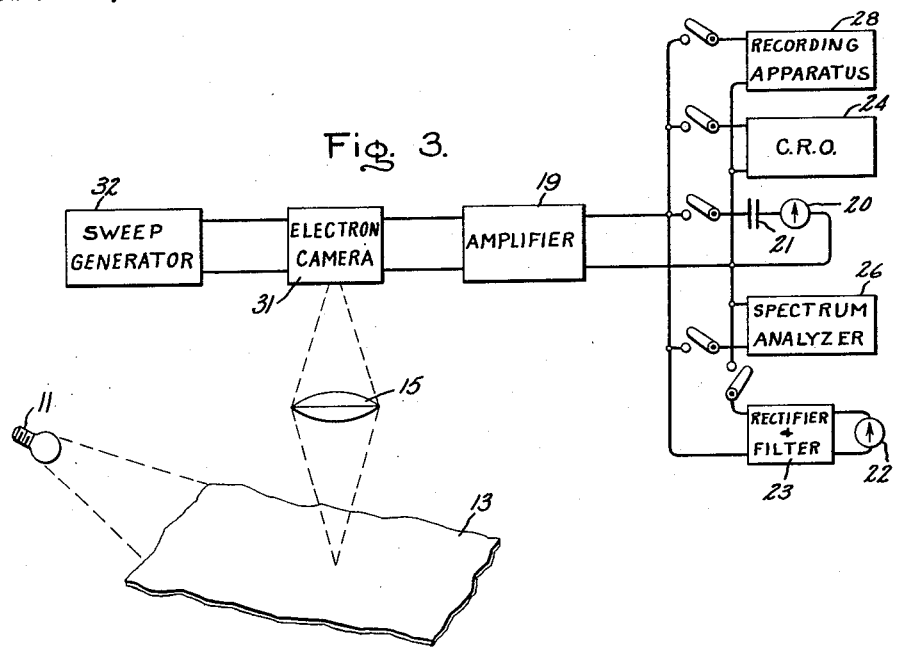
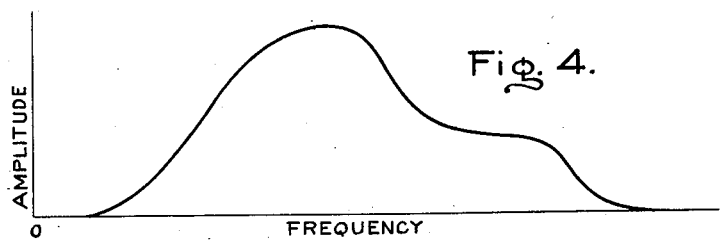
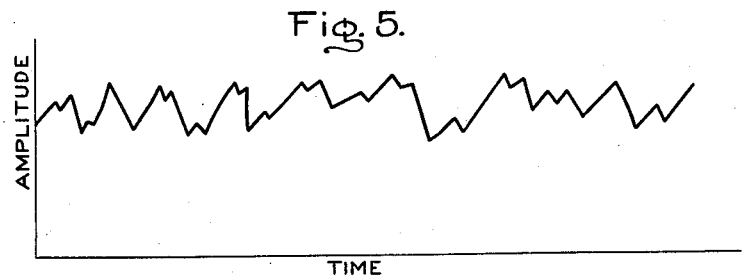
Inventor:
Harry R. Summerhayes, Jr.
by    Paul A. Frank
His Attorney.

United States Patent Office 2,803,161
Patented Aug. 20, 1957

2,803,161

SURFACE ROUGHNESS MEASURING METHOD AND DEVICE

Harry R. Summerhayes, Jr., Schenectady, N. Y., assignor to General Electric Company, a corporation of New York Application October 2, 1952, Serial No. 312,801

13 Claims. (Cl. 88—14)

This invention relates to a roughness monitoring method and device.

More particularly, the invention relates to a new method and means for determining the roughness of the surface structure of materials made up of microscopic granular particles, or of the surface structure of homogeneous materials whose surface has been roughened by grinding, polishing, or working in a lathe, etc.

In the manufacture and use of the above-mentioned types of materials, it is quite frequently desirable to obtain some idea of the structural arrangement of the particles at the surface of the material in order to determine the characteristics or qualities of the material. One example of a material of this class is paper manufactured from pulp wood. Such paper is comprised of a number of intermeshed, microscopic wood fibers held together by mutual interlocking of the microscopic wood fibers. The characteristics of this paper are generally determined by the manner in which the microscopic wood fibers are held together, for this latter factor in turn determines the characteristics or qualities of the finished paper, such as the manner in which ink will be absorbed, its light reflecting characteristic, the readability of printed characters thereon, etc. Consequently, in order to control the quality or characteristics of pulp wood paper during manufacture thereof, it is first necessary to obtain some information pertaining to the arrangement of the microscopic wood fibers in its surface structure. This information can then be used in modifying the manufacturing process to provide the desired quality paper. In the event the device is used to check the results of a grinding or polishing operation, the results can be used to modify the process so as to achieve the desired end results.

In the past, commercial devices have been made for determining the microscopic surface structure characteristics of materials of this general class, which have operated on the principle of a phonograph in that they have utilized special pickup heads employing a stylus which rides on the surface of the material, and furnish a record of the profile of the surface in the form of an alternating electrical signal indicative of the roughness of the surface in question. This method of determining microscopic surface structure characteristics has not been entirely satisfactory for paper because of inherent limitations which include the possibility of tearing the paper or material being tested and the slow speed at which the material must move while being monitored. For example, paper is made in continuous strip form which may move at speeds as high as 2000 ft./min. in some parts of the processing, and this is far too fast for phonograph-type monitoring devices. Another known device of the same general type is a gloss meter which can be used to provide a measure of the gloss of paper by determining the ratio of specularly reflected light to diffusely reflected light. However, devices of this nature do not furnish sufficient information of the profile or surface irregularities to form a complete picture of the microscopic surface structure, and consequently are not suitable for the purpose intended.

Still another known device for obtaining information concerning the roughness characteristics of paper, is disclosed in U. S. patent application Serial No. 250,880—Smoothness Monitoring Method and Device—E. D. Cook, inventor, filed October 11, 1951, Patent No. 2,755,702; issued July 24, 1956, owned by the General Electric Company, assignee of the present application, and comprises a means for illuminating the surface structure of a material to be monitored in a manner such that the microscopic surface structure of the material is emphasized. The device further includes an optical assembly for optically producing magnified images representative of the arrangement of the microscopic granular structure of the surface being illuminated, a means for converting the optical images into an alternating electric signal indicative of the surface arrangement of the granular particles, and instrument means for producing observable indications of the electric signal thus developed. While roughness monitoring devices of this last described type are more than satisfactory for their intended purpose, they do have certain shortcomings such as the introduction of errors due to variations in intensity of the source of illuminations, and also due to variations in average reflectivity due to changes in gloss of material being examined, etc.

It is, therefore, one object of the present invention to provide an improved method and means for obtaining a more reliable indication of the roughness of the surface of materials composed of the microscopic granular particles or of homogeneous materials whose surface has been roughened by grinding, polishing or working in a lathe, etc.

Another object of the invention is to provide a non-contacting, optical type smoothness monitoring device for materials of the above-mentioned class which is not subject to error due to variations in background or average reflectivity of the material being examined, or to errors due to variations in intensity of the source of illumination.

Briefly stated, the present invention provides a novel method of determining the roughness of the surface structure of materials having a roughened surface which includes illuminating the surface of the material to be monitored in a manner such that the microscopic surface structure is emphasized, optically producing magnified images representative of the arrangement of the microscopic irregularities in the surface being examined, converting the images thus produced into electrical signals having both alternating and direct current components indicative of the surface arrangement, and deriving a measure of the roughness of the surface from the electrical signals thus developed.

For the purpose of carrying out the above-described method, the invention also provides a novel smoothness monitoring device which includes a light source for illuminating the material to be monitored in a manner such that its microscopic surface structure is emphasized, an optical system for reproducing images of the microscopic surface structure of the material, means for moving the material and the optical system relative to one another, an electron optics device disposed in the image path of the optical system for producing electrical signals having both alternating and direct current components indicative of the condition of the microscopic surface structure surveyed by the optical system, and instrument means connected to the electron optics device for producing perceptible indications of the electrical signals thus developed.

Other objects, features and many of the attendant advantages of this invention will be appreciated more readily as the same becomes understood by reference to the following detailed description, when considered in connection with the accompanying drawings, wherein like parts in all of the several figures are designated by the same reference character, and wherein:

Fig. 3 is a schematic diagram of a second embodiment of the roughness monitoring device;

Fig. 4 is a graph relating the amplitude of the response signal obtained by means of the novel roughness monitoring method to the size of the granular particles in the material being monitored; and Fig. 5 is a graph illustrating the surface profile of a particular material, obtained by means of the novel roughness monitoring method.

Figure 1:
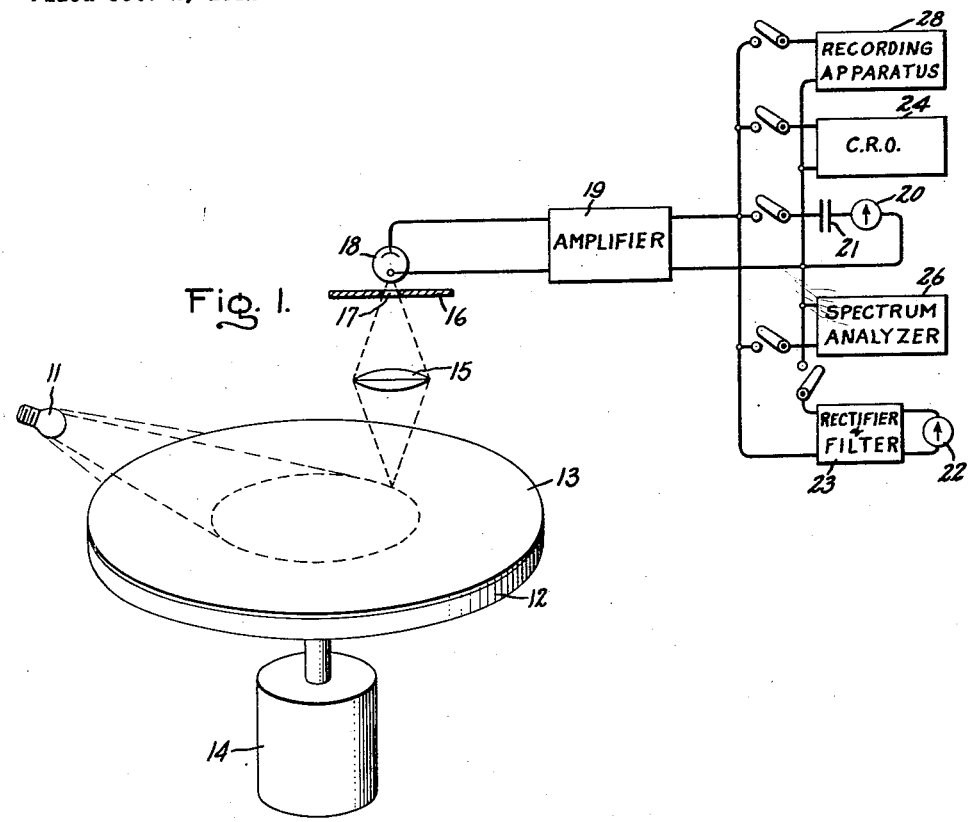
Fig. 1 is a schematic diagram of a roughness monitoring device constructed in accordance with the invention, and by means of which the novel method for determining roughness of paper and similar materials is carried out.

Referring now to Fig. 1 of the drawing, one embodiment of a roughness monitoring device by means of which the novel roughness monitoring method may be carried out, is illustrated. The device shown includes a source of light 11 of constant intensity which is physically disposed to one side of a material moving means. The material moving means comprises a turntable 12 driven by a motor 14 having positioned on the upper surface thereof a sample 13 of the paper or other material desired to be monitored. By positioning the turntable 12 to one side of light source 11, light shines on the surface of the sample 13 at a glancing oblique angle in such a manner that the raised microscopic particles in the surface of the sample cast shadows over the surrounding surface, and emphasizes the difference in the microscopic "mountains" and "valleys" that form the surface. While the particular material moving means disclosed comprises a turntable for receiving a sample of the material, it should be understood that the device could be easily mounted on a material making machine so as to monitor a continuous belt of the material as the same moves past the device during the manufacturing process, or some other mode of moving the sample 13 could be provided.

Physically disposed in a light path that is preferably normal to the surface of the material 13, is an optical means or system for reproducing images of the microscopic surface structure of the sample of material 13. The optical means includes a magnifying lens 15 which is preferably a microscope objective lens having a relatively large optical magnification, for example, in the neighborhood of 10 or more. Positioned in the image path of lens 15, is a disk 16 having an aperture 17 therein through which light rays may pass. Armature 17 has a diameter which is related to the optical magnification of the lens 15, and together with the lens 15 serves to restrict the area scanned on the surface of material 13 to dimensions of the order of the microscopic granular particles out of which the material 13 is constructed. For example, if the lens 15 has an optical magnification in the neighborhood of 10, and the diameter of the aperture 17 is in the neighborhood of $\frac{1}{100}$ of an inch, the image produced at the focal point of the lens is converted into an effective viewing area, when referred to the surface of material 13, of some $\frac{1}{1000}$ of an inch in diameter. An optical system having these particular parameters would be used in measuring the roughness of a surface in which the minimum sized grain structure of interest is $\frac{1}{1000}$ of an inch. This particular system would yield profile and roughness information of the surface structure with a resolution of about $\frac{1}{1000}$ of an inch.

Disposed adjacent disk 16 in the image path of the light rays passing through aperture 17, is an electron-optics device which comprises a photo-multiplier tube 18 physically situated at the focal point of the lens 15.

The output of photo-multiplier tube 18 is coupled to a wide band pass amplifier 19 of standard construction which in turn has its output coupled to a means for indicating the value of the signals produced by the photo-multiplier tube. This last-mentioned means preferably comprises a root mean square meter 20 of the moving coil galvanometer type coupled to the output of amplifier 19 through a coupling capacitor 21 and selecting switch for obtaining an indication of the value of the alternating current component of the electric signal produced by the electron-optics scanning system, and a direct current indicating instrument 22 coupled to the output of amplifier 19 through a rectifier and filter circuit arrangement 23 and a selecting switch for producing an indication of the direct current component of the electric signal produced by the electron-optics system. By this arrangement, the root mean square meter 20 provides a measure of the instantaneous variations in intensity of illumination of the material under inspection, and the direct current indicating instrument 22 provides a measure of the average intensity of the background illumination of the material under inspection. If desired, the indicating means may also include any one of the following instrument means alone, but preferably comprises all of the following: a cathode ray oscilloscope 24, a spectrum analyzer device 26, and a recording apparatus 28 are adapted to be selectively coupled to the output of amplifier 19 through suitable selecting switches.

In carrying out the novel roughness determination method with the above-described apparatus, the sample of material 13 to be monitored is situated on turntable 12, and the turntable rotated. The speed with which the turntable 12 is rotated, is dependent upon the particular measurement to be made, and this, of course, determines which ones of the indicating instrument means 20, 22, 24, 26, and 28, are used. As the sample of material 13 rotates, the intensity of the light derived from the microscopic area surveyed by lens 15 will vary in accordance with the shape of the microscopic "mountains" and "valleys" of the surface. This is believed to be evident from a consideration of Figs. 2a and 2b, and the manner in which the shadows are formed by the oblique lighting of the surface of the material 13. Hence, as the turntable passes through one cycle, alternate bright and dark spots will be brought into the viewing area of the optical system to vary the intensity of illumination of the image produced by the system. The varying intensity image produced by lens 15 is focused on photo-multiplier tube 18, and causes that device to produce an alternating electrical signal whose variations correspond to the varying intensity light emanating from the microscopic area of the surface structure of material 13. This alternating current signal is amplified by amplifier 19, and fed to meters 20 and 22 and selected ones of the indicating instruments 24, 26, and 28 which serve to derive perceptible indications of the desired characteristics.

Figure 2A:
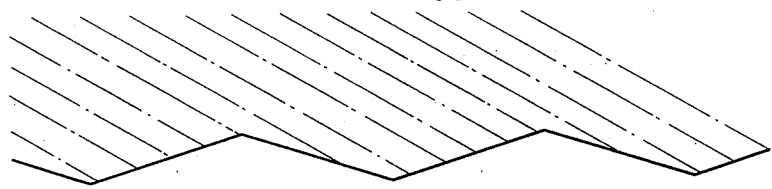
Fig. 2a is a sectional view of one sample of a material having a relatively smooth surface as defined by the present invention, and illustrates the same being illuminated from a source of light positioned at some oblique angle with respect to the plane of the material.
Figure 2B:
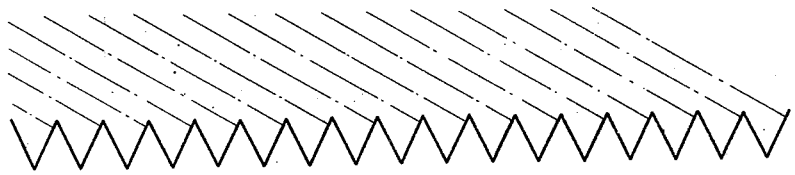
Fig. 2b is a sectional view of a second sample of material having a rough surface, and illuminated from a light source obliquely positioned with respect to the plane of the material.

In order to obtain an indication of the roughness or shape factor of the microscopic "mountains" and "valleys" in the surface of material 13, the turntable 12 is rotated at a speed such that the material 13 moves past the scanning area of the lens 15 at a speed determined primarily by the response of the indicating instruments being used. For best results, it has been determined that this speed should be in the vicinity of five inches per second for a surface in which the minimum size grain structure is $\frac{1}{1000}$ of an inch, and using an optical system having the parameters described in the preceding paragraph. It should be understood, however, that the exact speed is not limited to the value given, but may be varied in accordance with the ability of the system to follow the microscopic irregularities in the surface of material 13. Upon the application of the alternating signal produced by photomultiplier tube 18 to meter 20 through capacitor 21, the meter will indicate the root means square value of the alternating component of the signal. Simultaneously, the direct current component of the signal is derived by the rectifying and filtering circuit 23, and applied to direct current indicating instrument 22. With reference now to Figs. 2a and 2b of the drawings, two different samples having different types of surface configurations are shown. In Fig. 2b, the microscopic "valleys" and "mountains" are equal in depth to those in the sample shown in Fig. 2a, however the spacing between the "mountains" is much shorter. For this reason light rays impinging upon the surface of the sample from a light source positioned at some acute angle with respect to the plane of the surface in the manner depicted, will illuminate substantially all of the surface of the sample shown in Fig. 2a, and will produce a relatively large number of dark areas on the surface of the sample shown in Fig. 2b due to shadowing. Hence, the alternating current component of the electric signal produced by the optical scanning system will have a much greater amplitude in the case of the sample shown in Fig. 2b than in the case of the sample shown in Fig. 2a.

Because the shape or configuration of the surface of the sample (i. e. the spacing between peaks as well as the heights thereof) being tested affects the printability or ink absorbing characteristics of the paper much more than the absolute depth or height of the microscopic "valleys" and "mountains," information concerning the surface configuration is of considerable importance. It would be, of course, possible to utilize only the alternating current component of the electric signal developed by the optical scanning system to provide an indication of the relative roughness of the surface under examination in the manner disclosed in the above-identified U. S. patent application, however, such an indication would not be entirely reliable because of the possibility of the introduction of errors therein due to variations in the average intensity of illumination or in the average reflectivity of the surface.

In order to overcome any errors that might be introduced because of the above-mentioned causes, the roughness factor of the surface is defined as the ratio of the alternating current component of the electric signal produced by photocell unit 18, to the direct current component of the signal. By utilizing this method of calculation of the surface roughness, a much more reliable indication of surface roughness may be obtained since the roughness factor is defined in terms of ratio, and variations due to the above-mentioned causes are cancelled out. In order to facilitate measurement of the roughness factor, a direct reading ratio meter can be used in place of the direct current meter 22 and root mean square meter 20.

A spectrum analysis of the frequency components of the alternating signal produced by photo-multiplier tube 18 may be obtained by merely closing the selective switch that couples spectrum analyzer 26 to the output of amplifier 19, while the turntable 12 is rotating the sample of material 13 at substantially the same speed as that used while the roughness measurement of sample was carried out. The spectrum analyzer 26 is a conventional wave analyzer available on the market commercially, and comprises means for selectively amplifying different controllable frequency bands of the signal spectrum, and a meter for indicating the amplitude of the alternating current components at the particular frequency band to which the spectrum analyzer is tuned. By taking a number of readings at different frequencies with the analyzer, a curve such as Fig. 4 of the drawings may be plotted relating the amplitude and frequency characteristics of the alternating signal developed by tube 18. By correlating this information with the speed of rotation of the sample of material 13, the graph shown in Fig. 4 may be interpreted in terms of the equivalent wave length at the paper surface, thereby giving an indication of the distribution of the sizes of the granular particles in the surface of the paper. As an example, if all of the grains in the material are uniformly disposed throughout each linear inch of its surface and are of uniform size, and if the material is moving at a speed that is constant, the evenly distributed microscopic "mountains" and "valleys" will produce variations in the intensity of the light reaching photocell unit 18 at a fixed repetition frequency. However, in actual practice most materials have a variety of surface grain sizes and consequently the variations in the intensity of the light reaching photocell 18 have a frequency distribution such as that shown in Fig. 4. A consideration of the size distribution of the granular particles, along with the value of roughness factor obtained from a combination of the readings of meters 20 and 22, then provides a great deal of information about the surface structure of material 13.

If, in addition to the above information, it is desired to obtain a record or picture of the profile of the material surface, meters 20 and 22 and spectrum analyzer 26 can be disconnected from the output of amplifier 19 by opening the selective switches associated with each of these devices, and cathode ray oscilloscope 24 and/or recording apparatus 28 connected to the output of amplifier 19 by closing the respective selecting switches thereof. Turntable 12 is then rotated at a comparatively slow speed dependent upon the response time of instruments 24 or 28, for example, in the order of $\frac{1}{300}$ of an inch per second for a recorder such as instrument 28 or somewhat faster for a cathode ray oscilloscope such as instrument 24 if a continuous visual picture is desired. The variations of intensity of the light beam converted by photo-multiplier tube 18 into an alternating current signal are then reproduced by cathode ray oscilloscope 24 and, if desired, permanently recorded on recording apparatus 28. The curve reproduced on the recording apparatus 28 or picture tube of cathode ray oscilloscope 24, is illustrated in Fig. 5 of the drawings, and has "mountains" and "valleys" which correspond to the actual microscopic "mountains" and "valleys" of the surface irregularities in the sample of material 13. Thus, the picture presented by recording apparatus 28 or the cathode ray oscilloscope 22 can be used to reconstruct the point-to-point profile of the surface of material 13 exactly in wavelength of roughness and to a high degree of correspondence in amplitude. Repeated recording of the profile of a surface along a circular path by continued rotation of the turntable on which the surface is mounted, serves to reproduce copies of the profile with a high degree of correspondence.

Referring now to Fig. 3 of the drawings, a second embodiment of a roughness monitoring device whereby the novel method of roughness determination may be carried out, is illustrated. This embodiment of the device may be used to inspect a portion of the material 13, to be monitored while the same is an integral part of a belt of material being manufactured or alternatively, the subject embodiment of the device may be used with a portion of material 13 that is stationary. The material 13 is illuminated by a source 11 of constant intensity light that is spaced to one side of the material so that the light rays therefrom strike the surface of the material 13 at an oblique angle, and emphasize the microscopic surface irregularities of the material in a manner similar to that described in the relation to the embodiment of the roughness monitoring device shown in Fig. 1 of the drawings.

Positioned in a light path that is preferably normal to the surface of material 14 is an optical means that includes a lens 15 that comprises a microscopic objective lens, and which corresponds to the lens 15 in the device shown in Fig. 1 of the drawings. Lens 15 is positioned so that the image passed thereby is focused on a plane coincident with the face of an electron-optics device comprising a part of the overall smoothness monitor. The electron-optics device upon which the image produced by magnifying lens 15 is focused, comprises an electron camera tube 31 such as an iconoscope, an image orthicon, or an image dissector tube, controlled by a sweep generator 32 which causes the image focused on the face of the tube to be effectively scanned point by point by a stream of electrons whose flow is dependent upon the intensity of illumination of each point as the electron beam scans the same. Consequently, the electron current in the camera tube varies from point to point, and the variations of the electron current are a measure of the instantaneous irregularities in the microscopic surface structure of the portion of the material 14 surveyed by magnifying lens 15. By utilizing a lens having a proper optical magnification, and positioning lens 15 properly with reference to the face of camera tube 31, a relation can be established such that a point on the image focused on the face of electron camera tube 31 represents an equivalent microscopic area on the surface of the sample of material 13 which is of the order of the size of the granular particles comprising material 13. If thus constructed, the variations in the electron current of camera tube 31 will be representative of the microscopic surface irregularities in the surface of material 13.

Connected to the output of electron camera tube 31 is an amplifier 19 having its output coupled to a means for indicating the value of the signal produced by electron camera tube 31. The indicating means may include a root mean square meter 20 coupled to the output of amplifier 19 through a coupling capacitor 21, a direct current indicating instrument 22 coupled to the output of amplifier 19 through rectifier and filter circuit 23, a cathode ray oscilloscope 24, a spectrum analyzer 26, and a recording apparatus 28 connectable to the output of amplifier 19 through respective selecting switches associated therewith.

In operation, light intensity images of the portion of material 13 surveyed by lens 15 are focused on the picture face of electron camera tube 31. If the material 13 is moving relative to lens 15, the image produced by lens 15 need be scanned by electron camera tube 31 in only one direction transverse to the direction of movement of the material. The variations in the electron current of camera tube 31 can then be amplified by an amplifier 19, and the resulting signal applied to any one of the indicating instruments 20, 22, 24, 26 and 28 in the manner described in relation to Fig. 1 to provide a measure of the irregularities in the surface of material 13.

In the event that a portion of the material 13 is stationary, it is essential that the electron camera tube 31 scan the image focused on its face by lens 15 in two directions in order to produce an alternating signal indicative of the irregularities occurring in an area of the microscopic surface structure of the material 13. Consequently, when the portion of material 13 is stationary, sweep generator 32 is used to control the scanning action of electron camera tube 31, and causes the same to scan the image focused on its face from point to point. As previously stated, each point of the image on the face of the camera tube 31 corresponds to an equivalent area on the sample 13 of the order of the microscopic granular particles, and consequently, the variations in intensity of the light from point to point on the image on the face of the camera tube is a measure of the surface irregularities of the sample of material 13. This varying signal is amplified by amplifier 19, and an indication of the signal obtained by selectively applying the same to any combination or one of the instruments 20, 22, 24, 26 and 28.

From the foregoing description, it can be appreciated that the present invention provides an improved method and means for obtaining a reliable indication of the roughness of materials composed of microscopic granular particles. The means provided by the invention is a noncontacting roughness determination device which cannot tear or otherwise destroy the material being monitored, and which can be used to monitor material at any desired speed. Further the novel roughness determination method and means provides sufficient information pertaining to the microscopic surface structure of materials, to form a generally complete picture of such surface structure and reduces to a minimum errors in the readings due to variations in intensity of incident radiation, or to variations in the average reflectivity of the surfaces being examined.

Obviously, many modifications and variations of the present invention are possible in the light of the above teachings, and it is therefore to be understood that changes may be made herein which are within the full intended scope of this invention as defined by the appended claims.

What I claim as new and desire to secure by Letters Patent of the United States is:

1. A device for monitoring the smoothness of a material where there is relative motion between the device and the material including in combination means for illuminating the material to be monitored with light rays that form a relatively large oblique angle with respect to a normal to the surface of the material whereby the surface structure of the material is emphasized by variations of intensity of illumination therefrom, optical means positioned substantially normal to the surface of the material at the point of illumination for reproducing images of the microscopic surface structure of said material, an electron-optics device disposed in the image path of said optical means for producing electrical signals indicative of the condition of the surface structure surveyed by said optical means, means operatively connected to said electron-optics device for producing an indication of the average value of the intensity of illumination, and means operatively connected to said electron-optics device for producing an indication of the value of the variations in intensity of illumination from the microscopic surface structure being examined whereby the surface roughness of the material may be obtained from the ratio of said variations in intensity of illumination to said average value thereof.

2. A device for monitoring the smoothness of a material where there is relative motion between the device and the material including a combination means for illuminating the material to be monitored with light rays that form a relatively large oblique angle with respect to a normal to the surface of the material whereby the surface structure of the material is emphasized by variations in intensity of illumination therefrom, optical means including a magnifying lens for reproducing enlarged images of a minute portion of the microscopic surface structure of said material, an electron-optics device disposed in the image path of said optical means for producing electrical signals indicative of the condition of the surface structure surveyed by said optical means, means operatively connected to said electron-optics device for producing an electric signal indicative of the average value of the intensity of illumination, and means operatively connected to said electron-optics device for producing an electric signal indicative of the instantaneous variations in intensity of illumination from the microscopic surface structure being examined whereby the surface roughness of the material may be obtained from the ratio of said electric signal indicative of instantaneous variations in intensity of illumination to said electric signal indicative of the average value thereof.

3. A devce for monitoring the smoothness of a material where there is relative motion between the device and the material including in combination means for illuminating the material to be monitored with light rays that form a relatively large oblique angle with respect to a normal to the surface of the material whereby the surface structure of the material is emphasized by variations in intensity of illumination therefrom, optical means including a microscope objective lens for reproducing magnified images of minute portions of the microscopic surface structure of said material, an electron-optics device disposed in the image path of said optical means for producing electrical signals indicative of the condition of the surface structure surveyed by said optical means, and means operatively connected to said electron-optics device for producing an indication of the direct current component of the signal thus derived to thereby obtain an indication of the average value of the intensity of the illumination from the portion of the microscopic surface being examined, and an indication of the root mean square value of the alternating current component of the signal thus derived to thereby obtain an indication of the root mean square value of the variations in intensity of illumination from the portion of the surface structure being examined whereby the surface roughness of the material may be obtained from the ratio of said root mean square value to said average value.

4. A device for monitoring the smoothness of a material where there is relative motion between the device and the material including in combination a light source for illuminating the material to be monitored with light rays that form a relatively large oblique angle with respect to a normal to the surface of the material whereby the surface structure of the material is emphasized by variations in intensity of illumination therefrom, optical means for reproducing images of the microscopic surface structure of said material, means for moving said material and said optical means relative to one another, electron-optics means disposed in the image path of said optical means for producing electrical signals indicative of the condition of the surface structure surveyed by said optical means, means operatively connected to said electron-optics means for producing a perceptible indication of the average value of the intensity of illumination from the microscopic surface structure being examined, and means operatively connected to said electron-optics device for producing a perceptible indication of instantaneous variations in intensity of illumination from the microscopic surface structure being examined whereby the surface roughness of the material may be obtained from the ratio of said instantaneous variations in intensity of illumination to the average value thereof.

5. A smoothness monitoring device including in combination means for illuminating the material to be monitored with light rays that form a relatively large oblique angle with respect to a normal to the surface of the material whereby the surface structure of the material is emphasized by variations in intensity of illumination therefrom, optical means including a magnifying lens for reproducing enlarged images of a minute portion of the microscopic surface structure of said material, means for moving said material and said optical means relative to one another, electron-optics means disposed in the image path of said magnifying lens for producing electrical signals indicative of the condition of the surface structure surveyed by said optical means, means connected to said electron-optics device for producing a perceptible indication of the value of the direct current component of the electric signal thus derived, and means connected to said electron-optics device for producing a perceptible indication of the value of the alternating current component of the electric signal thus derived whereby the surface roughness of the material may be obtained from the ratio of said alternating current component to said direct current component.

6. A smoothness monitoring device including in combination means for illuminating the material to be monitored with light rays that form a relatively large oblique angle with respect to a normal to the surface of the material whereby the granular surface structure of the material is emphasized by variations in intensity of illumination therefrom, optical means including a microscope objective lens for reproducing magnified images of a minute portion of the microscopic surface structure of said material, means for moving said material and said optical means relative to one another, an electron-optics device disposed in the image path of said microscope objective lens for producing electrical signals indicative of the condition of the microscopic areas of surface structure surveyed by said optical means, means operatively connected to said electron-optics device for producing an indication of the value of the direct current component of the electric signal thus derived to thereby obtain an indication of the average value of the intensity of illumination from the microscopic area of the surface structure being examined, and means operatively connected to said electron-optics device for producing an indication of the root mean square value of the variations in intensity of illumination from the microscopic area of the surface structure being examined whereby the surface roughness of the material may be obtained from the ratio of said root mean square value to said average value.

7. The method of determining the roughness of the surface structure of materials comprised of elemental granular particles including illuminating the surface of the material to be inspected with light rays that form a relatively large oblique angle with respect to a normal to the surface of the material whereby the surface structure is emphasized by variations in intensity of illumination therefrom, optically producing images in time sequence which images are representative of the arrangement of the elemental granular particles in the surface being examined, converting the said images into electrical signals indicative of the arrangement of the granular particles, and producing indications of the value of the direct current component and of the alternating current component of the electric signal thus derived whereby the surface roughness of the material may be obtained from the ratio of said alternating current component to said direct current component.

8. The method of determining the roughness of the surface structure of materials comprised of microscopic elemental granular particles including illuminating the surface of the material to be inspected with light rays that form a relatively large oblique angle with respect to a normal to the surface of the material whereby the microscopic surface structure thereof is emphasized by variations in intensity of illumination therefrom, optically producing magnified images in time sequence which images are representative of the arrangement of the microscopic elemental granular particles in portions of the surface structure, converting the said images into electrical signals representative of the arrangement of the microscopic granular particles, producing indications of the value of the direct current component and of the alternating current component of the electric signal thus derived, and deriving an indication of the ratio of the value of the alternating current component of the signal to the direct current component of the signal.

9. A smoothness monitoring device including in combination means for illuminating the material to be monitored with light rays that form a relatively large oblique angle with respect to a normal to the surface of the material whereby the microscopic surface structure of said material is emphasized by variations in intensity of illumination therefrom, optical means for reproducing magnified images of minute portions of the microscopic surface structure of said material, said optical means including a magnifying lens and an apertured opaque member positioned adjacent said lens in the image path thereof, means for moving said material and said optical means relative to one another, electron-optics means comprising a photoelectric cell disposed in the image path of said optical means for producing electrical signals indicative of the condition of the microscopic surface structure surveyed by said optical means, means connected to said electron-optics device for producing an indication of the direct current component, and means connected to said electron-optics device for producing an indication of the alternating current component of the signal thus derived whereby the surface roughness of the material may be obtained from the ratio of said alternating current component to said direct current component.

10. A smoothness monitoring device including in combination means for illuminating the material to be monitored with light rays that form a relatively large oblique angle with respect to a normal to the surface of the material whereby the microscopic granular surface structure of the material is emphasized by variations in intensity of illumination therefrom, optical means for reproducing magnified images of portions of the microscopic surface structure of said material, said optical means including a magnifying lens assembly and an apertured opaque disc positioned adjacent said lens assembly in the image path thereof, means for moving said material and said optical means relative to one another, an electron-optics device comprising a photoelectric cell disposed in the image path of said lens for producing electrical signals indicative of the condition of portions of the microscopic surface structure surveyed by said optical means, a root mean square meter coupled to said electron-optics device through coupling capacitor means which blocks the direct current component of the output signal of said photoelectric cell for producing an indication of the alternating component of the electric signals thus derived, and a rectifier having a direct current measuring instrument in the output circuit thereof coupled to said electron-optics device for producing an indication of the direct current component of the electric signals derived thereby in order that the surface roughness of the material may be obtained from the ratio of said alternating current component to said direct current component.

11. A smoothness monitoring device including in combination means for illuminating the material to be monitored with light rays that form a relatively large oblique angle with respect to a normal to the surface of the material whereby the microscopic granular surface structure of the material is emphasized by variations in intensity of illumination therefrom, optical means including a lens for reproducing magnified images of portions of the microscopic surface structure of said material, an electron-optics device comprising an electron camera tube disposed in the image path of said lens for producing electrical signals indicative of the condition of the microscopic surface structure surveyed by said lens, a coupling capacitor coupled to the output of said electron camera tube for blocking the direct current component of the output signal of said electron camera tube, a root mean square indicating instrument connected to said blocking capacitor for producing an indication of the alternating current component of the signals coupled through said coupling capacitor, and a rectifier having a direct current measuring instrument in the output circuit thereof coupled to the output of said electron camera for producing an indication of the direct current component of the electric signal derived thereby in order that the surface roughness of the material may be obtained from the ratio of said alternating current component to said direct current component.

12. The method of determining the roughness of the surface structure of materials comprised of microscopic elemental granular particles including illuminating the surface of the material to be inspected with light rays that form a relatively large oblique angle with respect to a normal to the surface of the material whereby the microscopic surface structure thereof is emphasized by variations in intensity of illumination therefrom, optically producing magnified images of the arrangement of the microscopic elemental granular particles in portions of the surface structure in time sequence, converting the said images into a direct current electric signal indicative of the average roughness of the surface arrangement of the microscopic elemental granular particles and an alternating current signal indicative of the variations in roughness of surface arrangement of the elemental granular particles, and producing an indication of the roughness factor of the surface from the electric signals thus derived.

13. A device for monitoring the smoothness of a material where there is relative motion between the device and the material including in combination means for illuminating the material to be monitored with light rays that form a relatively large oblique angle with respect to a normal to the surface of the material whereby the surface structure of the material is emphasized by variations in intensity of illumination therefrom, optical means positioned substantially normal to the surface of the material at the point of illumination for reproducing images of the microscopic surface structure of said material, an electron-optics device disposed in the image path of said optical means for producing electrical signals indicative of the condition of the surface structure surveyed by said optical means, means operatively connected to said electron-optics device for producing an electric signal indicative of the alternating current component of the signal derived from said electron-optics device, means operatively connected to said electron-optics device for producing an electric signal indicative of the direct current component of the electric signal from said electron-optics device, and means operatively coupled to said electron-optics device for producing an indication of the relative values of said alternating current signal and said direct current signals.

References Cited in the file of this patent

UNITED STATES PATENTS

| | | |
|---|---|---|
| 1,810,739 | Vedder | June 16, 1931 |
| 1,991,599 | Davis | Feb. 19, 1935 |
| 2,208,882 | Graff et al. | July 23, 1940 |
| 2,241,743 | Schoene | May 13, 1941 |
| 2,246,501 | Bradner et al. | June 24, 1941 |
| 2,502,503 | Berkley | Apr. 4, 1950 |
| 2,561,197 | Goldsmith | July 17, 1951 |
| 2,604,809 | Mitchell | July 29, 1952 |